United States Patent [19]

Obayashi et al.

[11] Patent Number: 4,677,595

[45] Date of Patent: Jun. 30, 1987

[54] ULTRASONIC VEHICLE RANGEFINDER

[75] Inventors: Hiroaki Ōbayashi, Yokosuka; Hiroshi Kobayashi; Kiyoshi Takeuchi, both of Yokohama, all of Japan

[73] Assignee: Nissan Motor Co., Ltd., Yokohama, Japan

[21] Appl. No.: 657,296

[22] Filed: Oct. 3, 1984

[30] Foreign Application Priority Data

Oct. 3, 1983 [JP] Japan .................................. 58-184359
Oct. 11, 1983 [JP] Japan .................................. 58-188371

[51] Int. Cl.⁴ ......................... H04B 17/00; G01S 9/66
[52] U.S. Cl. ....................................... 367/13; 367/99; 367/107; 367/112; 73/1 DV
[58] Field of Search .................. 367/13, 99, 107, 112, 367/87; 73/1 DV

[56] References Cited

U.S. PATENT DOCUMENTS 3,427,866 2/1969 Weighart .............................. 367/99

FOREIGN PATENT DOCUMENTS

| 0103074 | 8/1979 | Japan | 367/13 |
| 56-665 | 1/1981 | Japan . | |
| 57-68574 | 4/1982 | Japan . | |
| 57-84375 | 5/1982 | Japan . | |
| 57-93271 | 6/1982 | Japan . | |
| 57-175266 | 6/1982 | Japan . | |
| 0179678 | 11/1982 | Japan | 367/99 |
| 0066079 | 4/1983 | Japan | 367/87 |

Primary Examiner—Thomas H. Tarcza
Assistant Examiner—Daniel T. Pihulic
Attorney, Agent, or Firm—Schwartz, Jeffery, Schwaab, Mack, Blumenthal & Evans

[57] ABSTRACT

An ultrasonic vehicle rangefinder having a detecting system for discriminating whether trouble is in transmission or reception side is shown. The discrimination is established by detection of an attenuation vibration at a transmission microphone.

10 Claims, 13 Drawing Figures 4,677,595

ULTRASONIC VEHICLE RANGEFINDER

BACKGROUND OF THE INVENTION

This invention relates to an ultrasonic vehicle rangefinder, in particular, to a device which uses electromagnetic waves and ultrasonic waves and measures the distance to an object from the travel time of the latter, and also measures the relative speed between the objects and the vehicle.

There are already several ultrasonic rangefinders in existence, for example the one described in Utility Model Published Application No. Sho 57-68574. Such a device emits ultrasonic waves from an ultrasonic microphone and receives the pulses reflected from an object by means of a reception microphone. The distance is found from the phase difference between the emitted pulse and the received pulse.

However, in a previously existing ultrasonic rangefinder, if trouble should arise in distance measurement there is no way to tell if the trouble is in emission or reception. To troubleshoot such a device it is necessary to use a second ultrasonic rangefinder to aid in judging whether the trouble is in emission or in reception. This is troublesome.

In addition, when it rains there is the problem of mud getting on the transmitter or receiver, or both. In such a case it sometimes happens that no reflected waves are received and it is judged that something is wrong with the equipment. This is a particularly frequenct problem when, for example, the transmitter and receiver are mounted under the floor and aimed at the road to measure the speed of the vehicle (for example Utility Model Published Application Sho No. 56-665) and to measure the height of the vehicle and adjust it to road conditions.

SUMMARY OF THE INVENTION

An object of the invention is to provide an ultrasonic vehicle rangefinder which permits easy judgment as to whether trouble is in the transmitter or the receiver.

Another object of the invention is to provide an ultrasonic vehicle rangefinder which permits easy judgment as to whether trouble is caused inside the device.

The above objects are accomplished by provision of an ultrasonic vehicle rangefinder having a means for detecting attenuation vibrations and/or for detecting detour signals.

DETAILED DESCRIPTION OF THE EMBODIMENTS

To facilitate the understanding of the present invention, a brief reference will be made to a conventional rangefinder.

Figure 1:
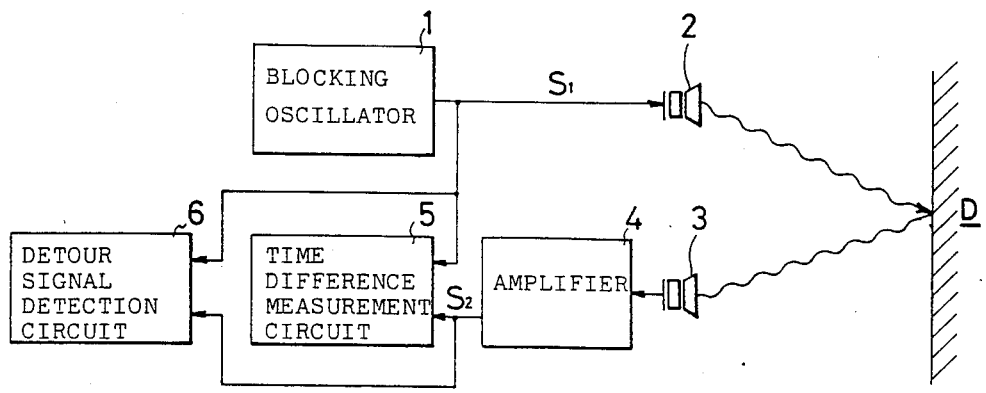
FIG. 1 is a block diagram of a conventional ultrasonic rangefinder.
Figure 2A:
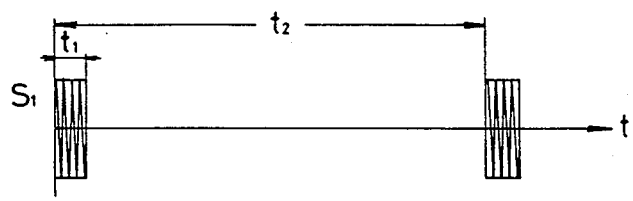
FIG. 2(a) shows the waveform of ultrasonic waves emitted from the ultrasonic transmitter microphone in FIG. 1

Referring to FIGS. 1 and 2, an ultrasonic rangefinder which uses ultrasonic waves to measure the distance to a target object is shown. The rangefinder includes a blocking oscillator 1 which generates high-frequency transmitted signals of time duration $t_1$ at time intervals $t_2$ as shown in FIG. 2(a), and the ultrasonic transmitter microphone 2 which receives the signal $S_1$ from the blocking oscillator 1 and emits ultrasonic pulses. The ultrasonic pulses emitted from the ultrasonic transmitter microphone 2 strike the target object D, if there is one, are reflected from it, and are received by the ultrasonic receiver microphone 3 which is mounted near the microphone 2. The reflected wave which is received here is amplified by the amplifier 4 and then input to the time difference measurement circuit 5. In the time difference measurement circuit 5, the time difference $t_4$ between the time when the ultrasonic pulse produced from the signal output by the blocking oscillator 1 was output and the time when the ultrasonic receiver microphone 3 received the wave reflected from the target object D is measured. The distance to the target object D can be found from this time difference $t_4$. This time difference $t_4$ is measured to the time when the lever of the received reflected wave signal exceeds a specified threshold value A.

Figure 2B:
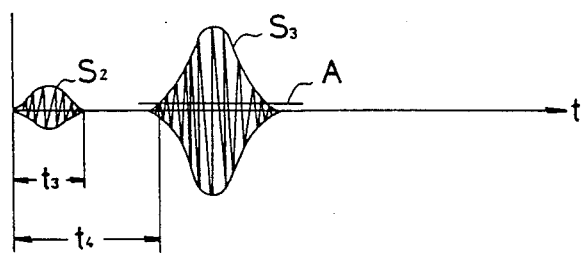
FIG. 2(b) shows the waveform of the signal received at the ultrasonic receiver microphone.

However, when the ultrasonic transmitter microphone 2 and the ultrasonic receiver microphone 3 are mounted close to each other, there is always a detour wave which travels through the air from the microphone 2 to the microphone 3; this detour wave is also received by the microphone 3, converted to an electrical signal by the amplifier 4 and output as a detour signal $S_2$ (the time duration $t_3$ of this signal $S_2$ is determined by the distance between the microphones 2 and 3) as shown in FIG. 2(b). In order to prevent this detour signal $S_2$ from being mistaken for a real signal by the time difference measurement circuit 5, the reflected signal output by the amplifier 4 is not sampled during the time interval $t_3$ after the initial signal is output by the blocking oscillator 1 until the detour signal is received. The detour signal detection circuit 6 detects the presence (or absence) of a detour signal during a preset time interval $t_3$ after the initial signal is output by the blocking oscillator 1.

Thus, when the rangefinder described above is operating normally either a reflected signal or a detour signal is always being received; when neither a reflected signal nor a detour signal is being received it follows that something has gone wrong in the equipment.

Figure 3:
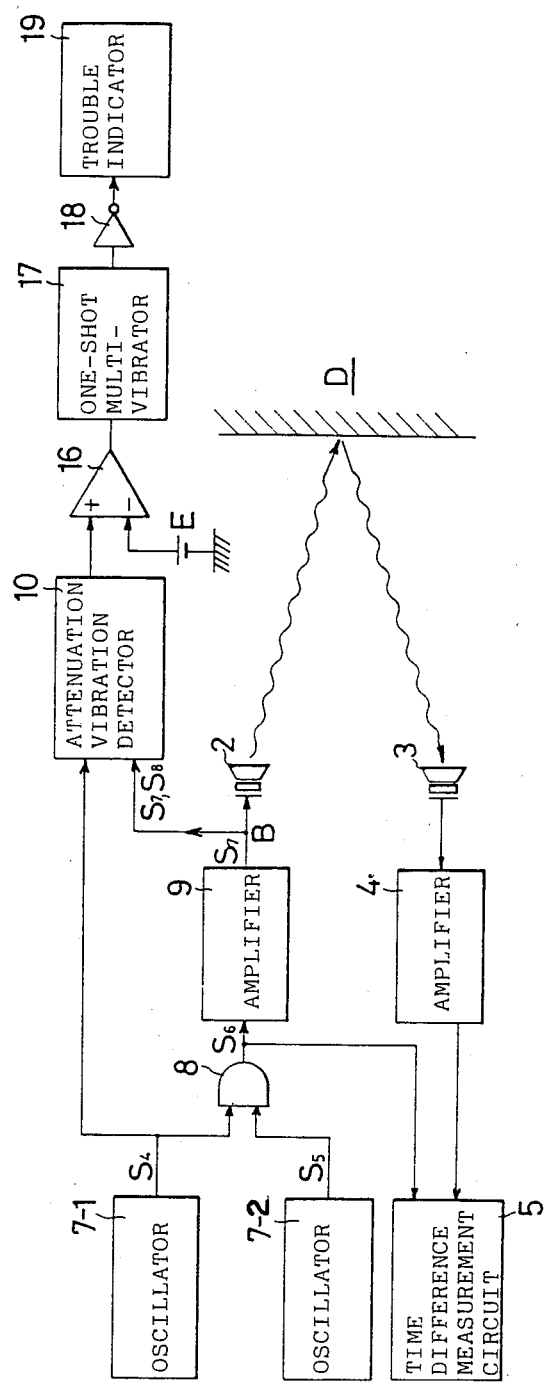
FIG. 3 is a block diagram of an embodiment of the present invention.
Figure 4:
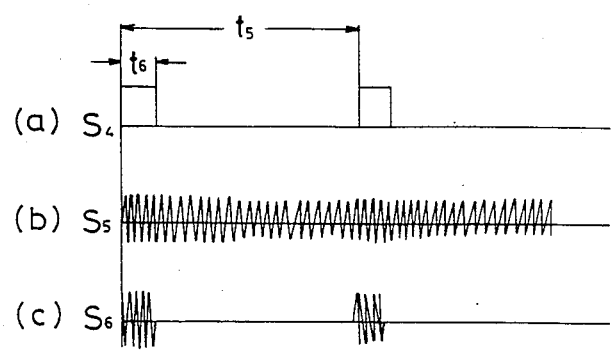
FIG. 4 show output waveforms of the oscillators in FIG. 3 and the output waveform from the AND circuit in FIG. 3.

FIG. 3 is a block diagram of an embodiment of this invention in an ultrasonic rangefinder and FIG. 4 shows output waveforms generated in the rangefinder. The numbers refer to the some components as in FIG. 1. The rangefinder shown in FIG. 3 includes the oscillator 7-1, which generates a positive pulse signal $S_4$ of time duration $t_6$ at time intervals $t_5$, based on the distance to the object as shown in FIG. 4a, and the oscillator 7-2 which generates a signal at the resonant frequency of the ultrasonic transmission microphone 2. The rangefinder emits a high-frequency signal $S_5$ such as that shown in FIG. 4(b). The output signal $S_4$ from the oscillator 7-1 and the output signal $S_5$ from the oscillator 7-2 are input to the AND circuit 8. An intermittent transmission signal $S_6$ is output from this AND circuit 8. This transmission signal $S_6$ is amplified by the amplifier 9 and then emitted as ultrasonic pulses from the ultrasonic transmission microphone 2. In this emobodiment the ultrasonic transmitter consists of the oscillators 7-1 and 7-2, the AND circuit 8, the amplifier 9 and the ultrasonic transmission microphone 2.

Figure 5:
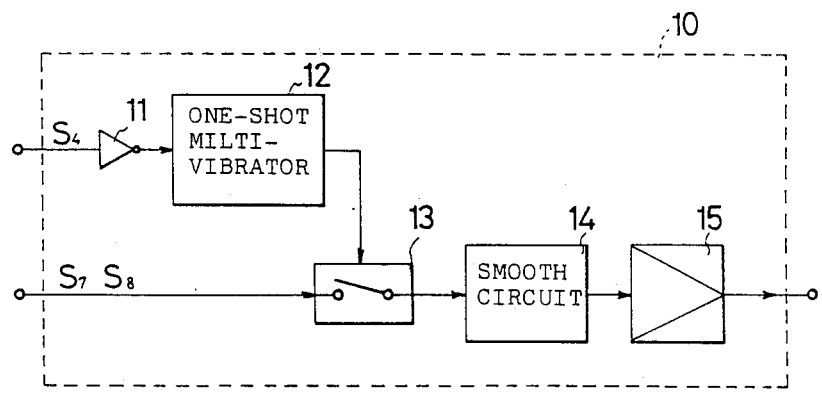
FIG. 5 is a block diagram of an embodiment of the attenuator vibration detector used in this invention.

The attenuation vibration detector 10 detects the attenuation vibrations in the ultrasonic transmission microphone 2 when the signal at point B on its input side, produced from the output signal $S_4$ of the oscillator 7-1, is input to it. FIG. 5 is a block diagram of one example of such an attenuation vibration detector. In FIG. 5, the transmission signal $S_4$ from the oscillator 7-1 is input to an inverter 11. An analogue switch 13 is switched ON and OFF by the output of an one-shot multivibrator 12. The output signl from the switch 13 is input to an amplifier 15 through a smoothing circuit 14. The output from the attenuation vibration detector 10 is compared with a preset reference level E in the comparator 16 in FIG. 3; if the level of the signal from the detector 10 exceeds the reference level E, "1" is output. The output is input to an inverter 18 through an one-shot multivibrator 17 and a trouble indicator 19 indicates trouble based on the output of the comparator 16. The ultrasonic receiver consists of the ultrasonic reception microphone 3 and the amplifier 4.

Figure 6:
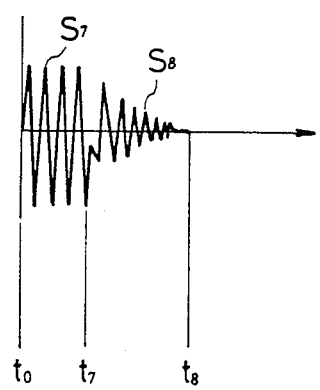
FIG. 6 shows the signal waveform at the input side of the ultrasonic transmitter microphone in accordance with the invention.

If the signal waveform at the point B on the input side of the ultrasonic transmission microphone 2 is observed with an oscilloscope, it is seen to consist of the signal $S_7$ from the time $t_0$ and the time $t_7$ and the signal $S_8$ from the time $t_7$ to the time $t_8$, as shown in FIG. 6. The signal $S_7$ is the amplified transmission signal from the amplifier 9 in FIG. 3. The signal $S_8$ is due to the attenuation vibrations generated when ultrasonic waves are emitted from the ultrasonic transmission microphone 2. That is to say, this signal $S_8$ due to the attenuation vibrations is produced by the vibration of the vibrating surface of the ultrasonic transmission microphone 2, excited by the transmission signal $S_7$ which is emitted from time $t_0$ to time $t_7$, due to the sharpness of resonance Q of the ultrasonic microphone 2. This signal $S_8$ due to these attenuation vibrations are not generated when the ultrasonic microphone is not working, for example due to a cut wire or short circuit.

Next, let us explain the operaiton of the tranmission side when trouble occurs in the above-mentioned ultrasonic rangefinder. The operation of the reception side is the same as in a previously existing device such as the example shown in FIG. 1, so its explanation is omitted here.

Since the signal $S_8$ is generated due to attenuation vibrations in the microphone 2 when the transmission side is operating normally, while the analogue switch 13 is ON, as determined by the time $t_6$ of the signal $S_4$, the signal at point B on the input side of the ultrasonic transmission microphone consists of the transmission signal $S_7$ from the amplifier 9 and the signal $S_8$ due to the attenuation vibrations. This signal is output to the comparator 16 through the smoothing circuit 14 and the amplifier 15. In the comparator 16, since the level of the signal from the amplifier 9 exceeds the reference level E, the comparator 16 judges that nothing is wrong in the transmission side and outputs "1", so that trouble is not indicated on the trouble indicator 19 during the time (the interval determined by the one-shot multivibrator (the time interval from the fall time of a pulse signal $S_6$ shown in FIG. 4(c) to the rise time of the next pulse signal $S_6$). Consequently, in this case it is known that the trouble is either in the ultrasonic reception microphone 3 or in the reception side circuitry.

In contrast to this, when the trouble is in the transmission side, the signal $S_8$ due to the attentuation vibrations (refer to FIG. 6) is not generated, so the signal at the point B on the input side of the ultrasonic transmission microphone 2 consists only of the transmission signal $S_7$ (refer to FIG. 6) from the amplifier 9. Since the signal level from the amplifier 15 at this time is lower by the amount of the signal $S_8$, in the comparator 16 the level of the signal from the amplifier 15 drops below the reference level E, so that "0" is output indicating that there is trouble in the transmission side. Then "1" is output from the inverter 18 and a trouble indication is given on the indicator 19. Consequently, in this case it is known that there is trouble either in the ultrasonic transmission microphone or in the transmission side circuitry.

Thus, an indication is given when there is trouble in the ultrasonic transmission microphone 2 or in the transmission side circuitry, so that when there is trouble in the ultrasonic rangefinder, by looking at the indicator it is possible to easily tell whether the trouble is in the transmission side or the reception side.

In this embodiment, the rangefinder has been assumed to have two ultrasonic microphones respectively for transmission and for reception, but this invention can also be applied to a rangefinder in which the same microphone is used both for transmission and reception. It is also possible to have an alarm sound when there is trouble in the ultrasonic transmission microphone or the transmission side circuitry.

Figure 8:
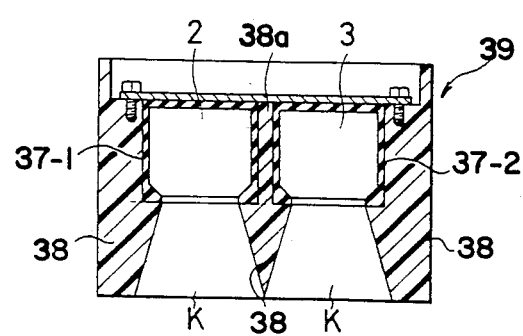
FIG. 8 is a section view showing a transmitter-receiver used in a embodiment of the invention.
Figure 7:
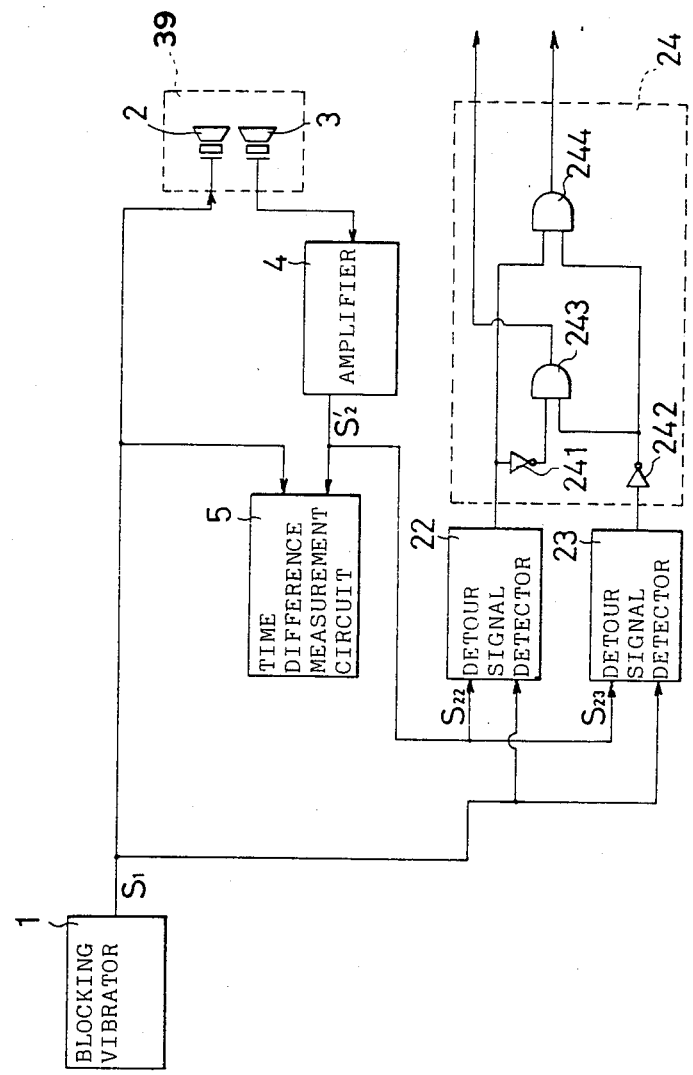
FIG. 7 is a block diagram of a embodiment of an ultrasonic vehicle rangefinder in accordance with the invention.

FIG. 7 is a block diagram of another embodiment of an ultrasonic vehicle rangefinder according to the invention. The reference numbers refer to the same components as in FIG. 1. In this embodiment, the ultrasonic transmission microphone 2 and the ultrasonic reception microphone 3 are covered by insulators of a material such as rubber, as shown in FIG. 8. They are mounted on a supporter 38 of a material such as plastic, through the insulators 37-1 and 37-2 to form the ultrasonic transmitter-receiver 39. This ultrasonic transmitter-receiver 39 is mounted on the underside of a vehicle with the openings K pointed down at the road. The insulator 37-1 and 37-2 of the ultrasonic transmitter-receiver 39 do not insulate the microphones 2 and 3 acoustically from the support 38. They somewhat attenuate the strength of the vibrations transmitted to the outside from the ultrasonic transmission microphone 2, and reduce the effect of vibrations from outside (from the vehicle body). Acoustically they play the role of a resistance. The support 38 has the shape of a horn to adjust the directionality of the ultrasonic microphones 2 and 3.

Figure 9:
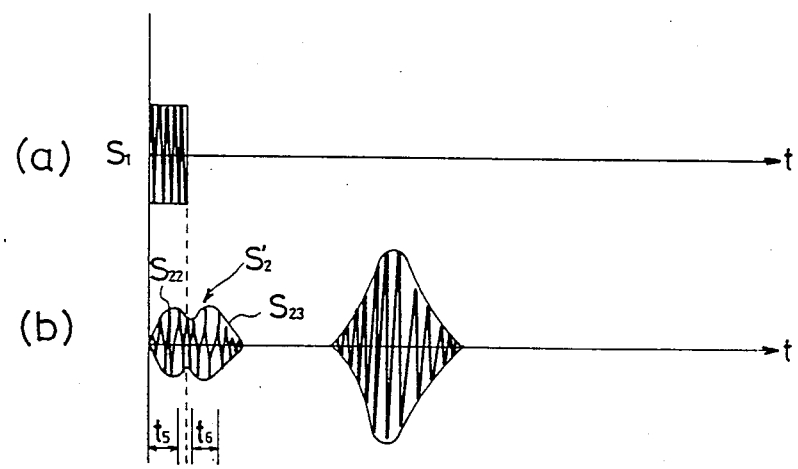
FIG. 9 is a block diagram of the ultrasonic transmitter and receiver and the waveform of the signal received by the ultrasonic receiver microphone.

In this ultrasonic transmitter-receiver 39, when a transmission signal $S_1$ such as that shown in FIG. 9(a) is output through the ultrasonic transmission microphone 2, the vibrations of the ultrasonic transmission microphone 2 are transmitted as vibrations through the insulator 37-1 on the microphone 2 side to the part 38a of the support 38 between the two microphones and then through the insulator 37-2 on the microphone 3 side to the ultrasonic reception microphone 3. Meanwhile, part of the wave transmitted by the ultrasonic transmission microphone 2 travels from the opening K of the microphone 2 to the opening K of the microphone 3 as a detour wave, and thence is transmitted to the ultrasonic reception microphone 3. Consequently, these vibrations and the detour wave are converted to a detour signal $S_2'$, such as that shown in FIG. 9(b), by the ultrasonic reception microphone 3, and output from the amplifier 4.

That is to say, the detour signal $S_2'$ consists of the detour signal $S_{22}$ arising from vibrations and the detour signal $S_{23}$ which comes from the detour wave and is slightly delayed with respect to this detour signal $S_{22}$.

Referring to FIG. 7, when the received signal sampled during the preset time interval $t_5$ (shown in FIG. 9(b)) after the start of transmission of the signal generated by the blocking oscillator 1 corresponds to the detour signal $S_{22}$ due to the vibrations transmitted from the ultrasonic transmission microphone 2 to the ultrasonic reception microphone 3, the detour signal detection circuit 22 outputs "1". Similarly, when the received signal sampled during the preset time interval $t_6$ (slightly longer than $t_5$, as shown in FIG. 9(b)) after the start of transmission of the signal generated by the blocking oscillator 1 corresponds to the detour signal $S_{23}$, the detour signal detection circuit 23 outputs "1".

Then, the discrimination circuit 24, enclosed in a dotted line, judges, on the basis of the outputs from these detour signal detection circuits 22 and 23, whether the trouble in the rangefinder is due to dirt covering the transmission and reception surfaces of the ultrasonic transmitter-receiver 39 or to real trouble in the circuitry or in the transmitter-receiver 39. The discrimination circuit 24 consists of the inverters 241 and 242 and the AND circuits 243 and 244.

Next, the operation of the above-mentioned ultrasonic rangefinder will be described.

Since the detour signal detection circuits 22 and 23 both output "1" when the rangefinder is operating normally, the outputs of the AND circuits 243 and 244 of the discrimination circuit 24 are both "0". That is, in this case neither a signal to indicate trouble in the transmitter-receiver 39 or in the circuitry, nor a signal to indicate that the surface of the transmitter-receiver 39 is dirty, is output.

Next, when mud covers the transmission and reception surfaces of the ultrasonic transmitter-receiver 39 which is mounted on the underside of a vehicle, the detour ultrasonic wave is not received by the ultrasonic reception microphone 3, so the detour signal $S_{23}$ is not detected by the detour signal detection circuit 23, and the output of the detection circuit 23 becomes "0". In contrast, the detour signal $S_{22}$ due to vibrations is detected by the detour detection circuit 22, so "1" is output from the detection circuit 22. As a result, the output of the AND circuit 243 of the discimination circuit 24 becomes "0", but "1" is output from the AND circuit 244 to indicate that there is dirt on the ultrasonic transmitter-receiver 39, so in this case an indication that the ultrasonic transmitter-receiver 39 is dirty is given.

Next, suppose that trouble occurs in the ultrasonic reception microphone 3 of the ultrasonic transmitter-receiver 39. Since neither the detour wave from the ultrasonic transmission microphone 2 nor the vibrations are received, neither the detour signal $S_{23}$ due to the detour wave nor the detour signal $S_{22}$ due to the vibrations is detected by the detour signal detection circuits 22 and 23, and the outputs of the detection circuits 22 and 23 are both "0". As a result, the output of the AND circuit 244 of the discrimination circuit 24 becomes "0", but "1", indicating trouble in the ultrasonic transmitter-receiver 39, is output from the AND circuit 243, so in this case an indication that there is trouble in the ultrasonic transmitter-receiver 39 is given.

Thus, when the transmission and reception surfaces of the ultrasonic transmitter and receiver 39 are dirty with mud, a signal to indicate that fact is output, while when there is trouble in the microphone of the ultrasonic transmitter-receiver 39 is a signal to indicate that fact is output, so that by looking at the indicator it is possible to tell whether apparent trouble in the rangefinder is real or merely due to a dirty surface. This makes it easy to take the correct countermeasures.

It is also possible to have an alarm indicate whether there is real trouble in the equipment or merely a dirty surface.

In the former embodiment, the description is directed to a mechanism which indicates whether trouble, when it is real, is in the transmission side or the reception side of the rangefinder. In the later embodiment, the description is directed to a mechanism which indicates whether apparent trouble in the rangefinder is real or merely due to a dirty transmission microphone or reception microphone surface. It is clear that these two mechanisms are independent; it is possible to use either one separately or to use both together.

It should be understood, of course, that the foregoing relates only to preferred embodiments of the present invention and that numerous modifications or alterations may be made therein without departing from the spirit and scope of the invention as set forth in the appended claims.

What is claimed is
1. An ultrasonic rangefinder comprising:
an oscillator for intermittently generating high frequency signals;
a transmitter microphone for emitting an ultrasonic pulse toward a target object when said high frequency signals are received from said oscillator;
a receiver microphone for receiving an ultrasonic pulse reflected from said target object;
means for measuring the time difference between transmitted and received pulses;
means for detecting attenuation vibrations generated in said transmitter microphone after said high frequency signals have been input into said transmitter microphone;
means for distinguishing between a malfunction in the rangefinder on a transmission side or a reception side based on the output from the detecting means;
said detecting means comprising a switching means for disconnecting said oscillator from said distinguishing means when high frequency signals from said oscillator are input into transmitter microphone.
2. An ultrasonic rangefinder comprising:
a first oscillator for generating a pulse signal;
a second oscillator for generating high frequency signals;
circuit means connected to said first and second oscillators for receiving the signals from the first and second oscillators and outputting the high frequency signals while said pulse signal is received;

a transmitter microphone connected to said circuit means for emitting an ultrasonic pulse toward a target object when said high frequency signals are output from said circuit means;

a receiver microphone for receiving an ultrasonic pulse reflected from said target object;

means connected to said receiver microphone for measuring the time difference between transmitted and received pulses;

means connected to said transmitter microphone for detecting attenuation vibrations generated in said transmitter microphone after the high frequency signals have been input into said transmitter microphone;

means connected to said detecting means for distinguishing between a malfunction in the rangefinder on a transmission side or a reception side based on the output from the detecting means; and said detecting means further including a switching means for disconnecting said circuit means from said distinguishing means during a time that the pulse signal from said first oscillator is received by said detecting means.

3. An ultrasonic rangefinder of claim 2 further comprising:
a means for detecting a first detour signal mechanically transmitted from said transmitter microphone to said receiver microphone, and
a means for determining a malfunction in said receiver microphone connected to said means for detecting said first detour signal.

4. An ultrasonic rangefinder of claim 3 further comprising:
a means for detecting a second signal on the basis of a detour ultrasonic wave transmitted from said transmitter microphone to said receiver microphone, and
a means, connected to said means for detecting a second detour signal, for discriminating between a malfunction in said receiver microphone and dirt on a transmitting surface of said transmitter microphone or a receiving surface of said receiver microphone.

5. An ultrasonic rangefinder of claim 2, wherein, said attenuation vibration detecting means further comprises an one-shot multivibrator connected to said first oscillator.

6. A ultrasonic rangefinder of claim 5, wherein, said attenuation vibration detecting means further comprises a smoothing circuit at the output terminal of said attenuation vibration detecting means.

7. An ultrasonic vehicle rangefinder comprising:
a blocking oscillator,
a transmitter microphone which emits ultrasonic pulses toward a target object on the basis of the pulse signals transmitted from said oscillator,
a receiver microphone which receives ultrasonic pulse reflected from said target object,
a means for measuring a time difference between transmitting and receiving pulse,
a means for detecting a first detour signal mechanically transmitted from said transmitter microphone to said receiver microphone and
a means for determining a malfunction in said receiver microphone connected to said means for detecting said first detour signal.

8. An ultrasonic rangefinder of claim 7 further comprising:
a means for detecting a second detour signal on the basis of a detour ultrasonic wave transmitted from said transmitter microphone to said receiver microphone,
a means, connected to said means for detecting a second detour signal, for discriminating between a malfunction in said receiver microphone and dirt on a transmitting surface of said transmitter microphone or a receiving surface of said receiver microphone.

9. An ultrasonic rangefinder of claim 8, wherein, said transmitter and receiver microphones are constructed as a single unit to form a transmitter-receiver.

10. An ultrasonic rangefinder of claim 8, wherein, said means for detecting said first detour signal detects said first detour signal on the basis of the differential time between said first detour signal and the pulse signal generated in said blocking oscillator and said mans for detecting said second detour signal detects said second detour signal on the basis of the differential time between said second detour signal and the pulse signal generated in said blocking oscillator.

* * * * *